INVENTOR
Herbert Stemmler
BY Pierce, Scheffler & Parker
ATTORNEYS

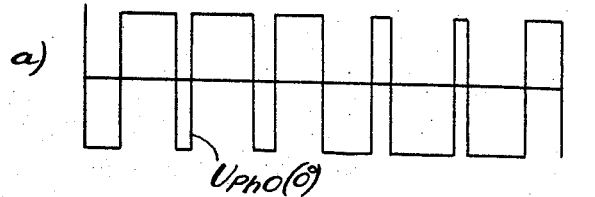
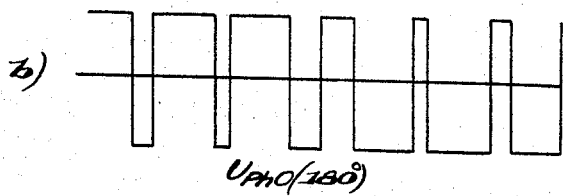
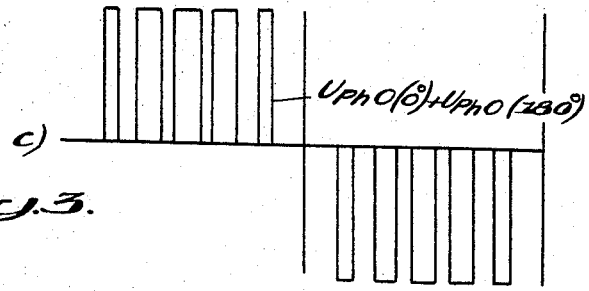
Fig. 3.
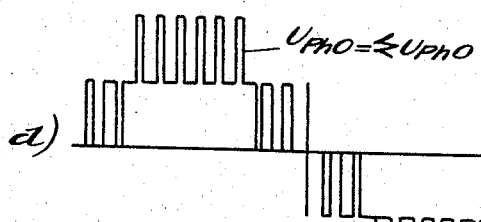
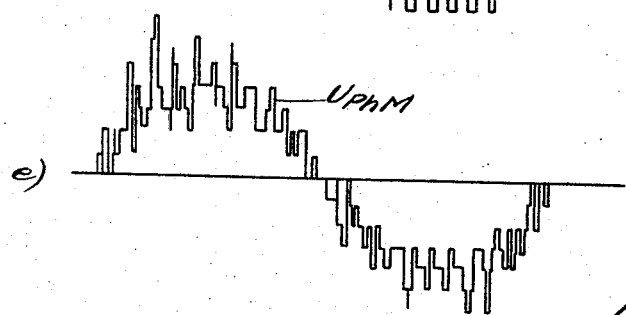
INVENTOR
Herbert Stemmler Oct. 10, 1967     H. STEMMLER     3,346,794
INVERTER CIRCUIT FOR SUPPLYING CURRENT TO POLYPHASE MOTORS
Filed April 12, 1965     4 Sheets-Sheet 3

INVENTOR

Herbert Stemmler

BY *Pierce, Scheffler & Parker*

ATTORNEYS

Oct. 10, 1967  H. STEMMLER  3,346,794
INVERTER CIRCUIT FOR SUPPLYING CURRENT TO POLYPHASE MOTORS
Filed April 12, 1965  4 Sheets-Sheet 4

INVENTOR
Herbert Stemmler

Pierce, Scheffler & Parker
ATTORNEYS

United States Patent Office 3,346,794
Patented Oct. 10, 1967

3,346,794
INVERTER CIRCUIT FOR SUPPLYING CURRENT TO POLYPHASE MOTORS
Herbert Stemmler, Baden, Switzerland, assignor to Aktiengesellschaft Brown, Boveri & Cie., Baden, Switzerland, a joint-stock company
Filed Apr. 12, 1965, Ser. No. 447,183
Claims priority, application Switzerland, Apr. 24, 1964, 5,402/64
8 Claims. (Cl. 318—227)

ABSTRACT OF THE DISCLOSURE

An inverter circuit for supplying a variable frequency polyphase alternating voltage output from a source of unidirectional voltage input comprises one or more pairs of inverter groups connected between the input and each phase of the output and each inverter group includes a pair of grid-controlled valves. One sinusoidal control voltage and two triangular control voltages displaced in phase by 180° are produced, and a mixer is provided for each group. Each mixer has two inputs, one of which is the sinusoidal control voltage and the other of which is the appertaining triangular control voltage. Each mixer provides two outputs connected respectively to the grids of the control valves of the appertaining inverter group. One output of each mixer carries a voltage when the instantaneous value of the triangular voltage is higher than the instantaneous value of the sinusoidal voltage and the other output of each mixer carries a voltage when the instantaneous value of the triangular voltage is lower than the instantaneous value of the sinusoidal voltage. The inverter groups are connected in parallel on their input side to the undirectional voltage, and the outputs of the groups are connected through impedance coils to the alternating voltage output.

---

The present invention relates in general to inverter circuits for deriving a polyphase alternating current from a direct current mains and which is supplied to a converter type motor at any desired motor frequency. As is known, such inverter-produced, variable frequency voltages as have been obtained with apparatus of known designs have a high content of harmonic voltages in addition to the fundamental wave, and the general object of the present invention is to provide an improved inverter circuit by which the harmonic parts of the motor voltage, or the harmonics formed in the current of the direct current mains by reaction, or both, are effectively reduced.

Converter type motors are driven in both directions and at different speeds from a frequency zero up to the rated frequency of the motor. Mostly they are asynchronous motors whose speed is mostly controlled by the frequency of the applied voltage. It is not sufficient in such case to vary only the frequency but one must also keep in mind that the flux in the air gap of the motor varies with the frequency. Since the flux increases as the frequency is decreased, it is necessary to reduce the motor voltage with diminishing frequency so that the product of voltage and cycle remains constant, i.e. a uniform voltage-time area is maintained.

The alternating voltage necessary for feeding the converter motor is produced by an inverter circuit from a direct current voltage mains. This D.C. voltage itself if not already available, can be produced from any available alternating current mains of a constant frequency by way of a conventional rectifier circuit. In this case, the D.C. mains is the intermediate D.C. circuit of an inverter. In order to achieve the desired operation of the inverter, one can use, for example, a method where the control of the inverter elements such as grid-controlled valves is effected by superposing a triangular voltage with a frequency which is higher than the highest motor frequency desired, and a sinusoidal voltage corresponding to any desired operating frequency for the motor. From these two voltage components applied to the grids of the valves, a substantially sinusoidal voltage at the frequency desired is obtained and applied to the motor, this voltage having a constant voltage-time area.

One conventional inverter circuit for deriving such an alternating voltage is depicted in FIG. 1 of the accompanying drawings along with various graphs showing the relationship between the voltages involved, the inverter-produced alternating voltage having a high harmonic content.

FIGS. 3a to 3e are graphs showing the relationship between various voltages involved in the inverter circuits according to the invention;

Figure 1:
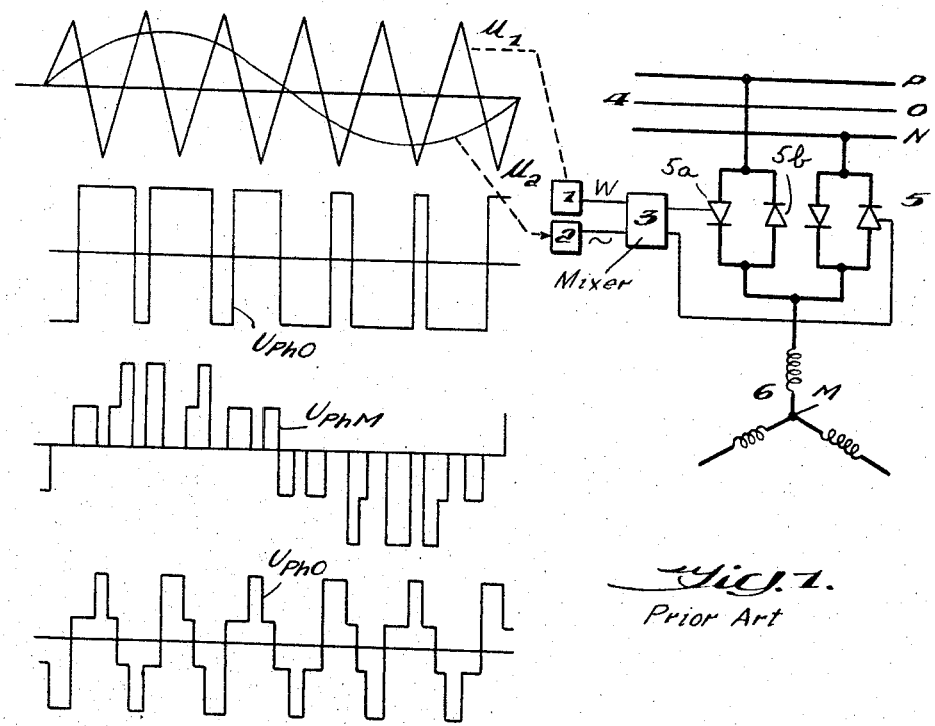

By way of background and with reference now to FIG. 1, a conventional inverter circuit for supplying a variable frequency alternating voltage from a direct current mains includes a direct current mains 4 which can, for example, be the intermediate D.C. circuit of a converter, the D.C. supply 4 being inverted by the inverter unit 5 into the desired alternating current which is then fed to polyphase motor 6. The D.C. mains includes the positive conductor side, or pole P, the negative conductor side N and a neutral conductor O. All three phases of motor 6 are depicted but in order to simplify illustration, only the inverter unit and controls therefor associated with only one phase of the motor have been included. The other phases of motor 6 are therefore understood to be connected in a similar way to the D.C. mains 4 through similar inverter units 5. The inverter arrangement 5 comprises anti-parallel, i.e. front-to-back connections between grid-controlled converter valves 5a and uncontrolled valves 5b. The desired control is effected by way of a mixing unit 3 of known construction and therefore shown only schematically in block form having its output connected to the grids of the two grid controlled valves 5a. Mixer unit 3 compares two voltages generated respectively in apparatus 1 and 2 also of known construction. In apparatus 1 is produced, for example, a triangular voltage $u_1$, the sides of the triangle being all equal. In apparatus 2 is produced a sinusoidal voltage $u_2$ which has the desired motor frequency. Voltage $u_1$ has a frequency which is higher than any frequency which may be desired for operation of motor 6. If $u_2$ is larger than $u_1$ a positive voltage is formed in the mixer unit 3; if $u_2$ is less than $u_1$ a negative voltage is formed in mixer unit 3. In this manner the grid-controlled converter valves 5$a$ related to each phase can be controlled in a direct manner. Motor 6 will have a voltage $U_{PhO}$ in relation to the neutral conductor O of the D.C. supply mains. This voltage is composed of rectangular parts and contains a sinusoidal fundamental wave because of the different widths of the rectangular parts. This voltage has strong harmonics. From this voltage can also be drawn off the voltage $U_{PhM}$ between a phase and the center connection point M of the three motor phases. This voltage is likewise depicted in FIG. 1. If the common connection point M is not grounded, one obtains the voltage illustrated. However, if point M is grounded, then $U_{PhM}$ would equal $U_{PhO}$. The voltage of point M against the neutral earth point O is likewise represented in FIG. 1 and designated by $U_{Mho}$. One sees that this voltage no longer contains the fundamental wave since it is cancelled, as known, in the three-phase system, but it contains all the harmonics which are present in the motor windings of each phase in the same direction and phase.

These harmonics have an adverse effect on the method of operation of motor 6 and particularly on its efficiency. In addition, harmonics are formed in the current on the D.C. voltage side of the converters which act again back on any A.C. voltage supply mains from which the intermediate D.C. voltage to be inverted at variable frequency has been obtained. These harmonics thus create a disturbance on such A.C. voltage supply mains.

As previously indicated, the object of the present invention is therefore to reduce these undesirable harmonics in the alternating current wave form and thereby correspondingly avoid the above-mentioned disadvantages.

The object of the invention is attained, in general, by using a plurality of inverter groups for each phase of the alternating current voltage produced for feeding the motor, and controlling these differently with respect to time in such a manner that the harmonics substantially cancel out each other.

Figure 2:
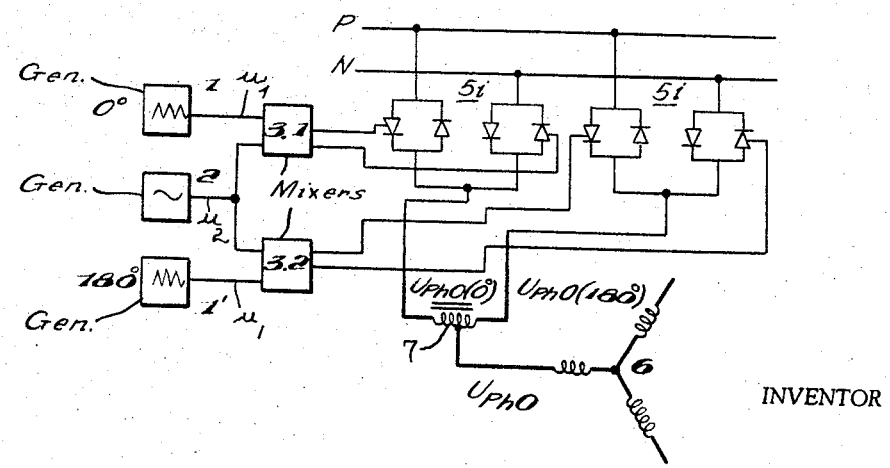
FIG. 2 illustrates an improved inverter circuit in accordance with the invention which results in a removal of much of this objectionable harmonic content, the improved circuit being characterized by use of a plurality of inverter groups per phase of the produced alternating current and which are differently controlled in such manner that objectionable harmonics essentially cancel each other.

One representative embodiment of the invention is depicted in FIG. 2. By way of example, two inverter groups or units 5$i$ are arranged in parallel and connected at their input sides to the positive and negative conductors P and N of the direct current mains 4. The grid controlled valves of one of the inverter groups 5$i$ are controlled by mixer unit 3.1 and the grid controlled valves of the other inverter group 5$i$ are controlled by a second mixer unit 3.2. The two inverter groups 5$i$ are combined at their output sides by connection to the opposite ends of an impedance coil 7 which functions in the manner of a "sucking solenoid" in rectifier circuits. The center of coil 7 is tapped and connected to one phase of motor 6. The mixer units 3.1 and 3.2 are each fed in the same general manner as the mixer unit 3 of FIG. 1. In generator 2 common to both mixer units is produced the sinusoidal voltage $u_2$ which corresponds to the desired frequency of operation for motor 6, in the same manner as for FIG. 1. This voltage is the same for both mixer units 3.1 and 3.2. Generator 1 produces a triangular voltage $u_1$ fed to mixer unit 3.1 which is similar in function to the triangular voltage produced by apparatus 1 in the FIG. 1 arrangement. Generator 1' also produces a triangular voltage $u_1$ which is supplied to mixer unit 3.2 but with a phase shift, for example 180°, relative to the voltage produced by generator 1. The frequency and amplitude of the two triangular voltages are, however, the same. The different timing applied to the controls effected by the two inverter groups 5$i$ results in a reduction of the harmonic content. In this connection, reference is made to FIGS. 3$a$ and 3$b$ which show the voltages produced in each inverter group. They have the same form as that shown in FIG. 1 except that they are displaced by 180°, and are designated $U_{PhO}(0°)$ and $U_{PhO}(180°)$. The superimposition yields in the motor the voltage $U_{PhO}$ between the neutral conductor O of the D.C. mains 4 and respective phase of the motor, and it is represented in FIG. 3$c$. One sees that the harmonic content is already considerably reduced by the fact that the negative and positive parts of the harmonic alternate. Correspondingly, the harmonic content in the voltages $U_{PhM}$ and $U_{MO}$ is also reduced but this is not shown in the diagrams.

Figure 4:
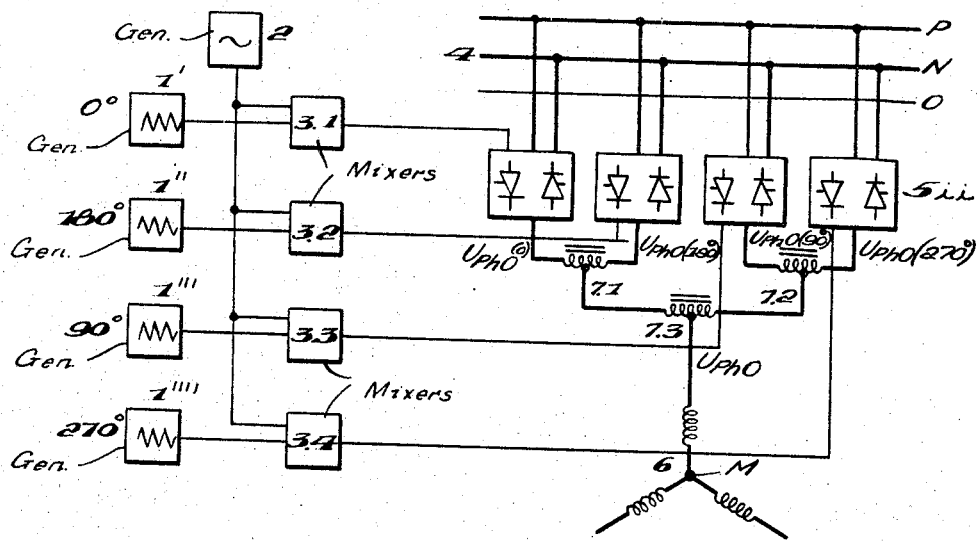
FIG. 4 illustrates an embodiment of the invention which utilizes four differently controlled inverter groups per phase.

One can go even further and combine four differently controlled inverter groups per phase of the alternating current voltage to be supplied to the motor. One suitable arrangement of this kind is illustrated in FIG. 4. The phase-shift of each of the four triangular voltage producing generators 1' to 1'''', which produce the voltage $u_1$ is then 90° and these phase shifts are indicated respectively in FIG. 4 by 0°, 180°, 90° and 270°. These are mixed respectively in mixer units 3.1 to 3.4 with the sinusoidal voltage $u_2$ produced in generator 2 which is common to all mixer units, and one then obtains the following voltages at the outputs of the inverter groups 5$ii$ as compared with ground potential—$U_{PhO}(0°)$, $U_{PhO}(180°)$, $U_{PhO}(90°)$ and $U_{PhO}(270°)$. At the inverter outputs, i.e. on the motor side, these voltages are combined in pairs over impedance coils 7.1 and 7.2. That is, two of the voltages with 0° and 180° phase shift are connected to the ends of impedance coil 7.1 and two of the voltages with 90° and 270° phase shift are connected to the ends of impedance coil 7.2. Connections are then made from center taps on coils 7.1 and 7.2 to the ends of still another impedance coil 7.3, and a connection is made from the center tap on coil 7.3 to one phase of motor 6.

The resulting voltages $U_{PhO}$ for these cases are represented in FIG. 3$d$ and designated with $$\Sigma U_{PhO} = U_{PhO}(0°) + \cdots$$

Beneath are represented in FIG. 3$e$ for these cases, the phase voltages for motor 6, i.e. between each phase and the neutral point M of the motor.

While the fundamental waves of the triangular voltage have disappeared in FIG. 3$c$ from the voltage $U_{PhO}$ and the second harmonic forms the substantial portion of the wave form, the second harmonic is also compensated in FIG. 3$d$ and only the fourth harmonic remains. This effect results from the fact that the fundamental wave is in phase-opposition due to the phase displacement of 180° for the triangular voltage $u_1$ so that they compensate each other when, on the one hand, the voltages $U_{PhO}(0°)$ and $U_{PhO}(180°)$ are combined and on the other hand when voltages $U_{PhO}(90°)$ and $U_{PhO}(270°)$ are combined. The second harmonic is compensated by this combination of the resulting voltage since it is already in phase-opposition by a phase displacement of 90° of the triangular voltage. In a similar manner, the third harmonic disappears. One can also go further with these compensating effects and also eliminate the fourth to the seventh harmonics by phase displacements in the triangular voltages $U_1$ of only 45°. These latter arrangements are not, however, illustrated in the drawings.

Figure 5:
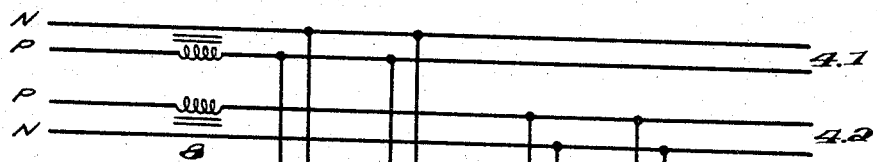
FIG. 5 illustrates another embodiment of the invention similar to FIG. 4 with the inverter groups series connected and with a different arrangement of impedance coils utilized between the inverter groups and the correlated phases of the converter motor.
Figure 5:
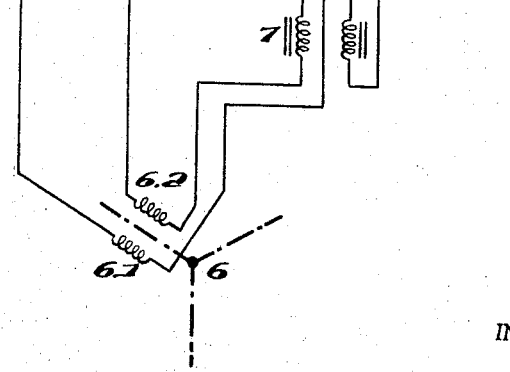

FIG. 5 illustrates an arrangement where the combination on the motor side of the inverter groups is achieved by a somewhat different connection of the impedance coils. This arrangement is advisable when the inverter groups 5$iii$ are connected in series, which can be of advantage at higher operating voltages. In this case, two direct current supply mains 4.1 and 4.2 are provided, and separate windings are arranged on the core of the impedance coil 7. In order to separate the circuits, the motor windings of each phase of the motor are separated into two parts 6.1 and 6.2 each connected to the output of an inverter group. The effect is practically the same as for a parallel connection, if the individual inverter groups 5iii are controlled in the manner indicated according to the invention. Moreover, other impedance coil means 8 are provided in the two D.C. supply mains 4.1 and 4.2 which can then compensate out harmonics in the D.C. circuit. Coil 8 couples the two D.C. circuits together by induction and the different harmonics are compensated out in the two D.C. mains by way of this coil 8 which functions in the manner of a balancing transformer.

Figure 6:
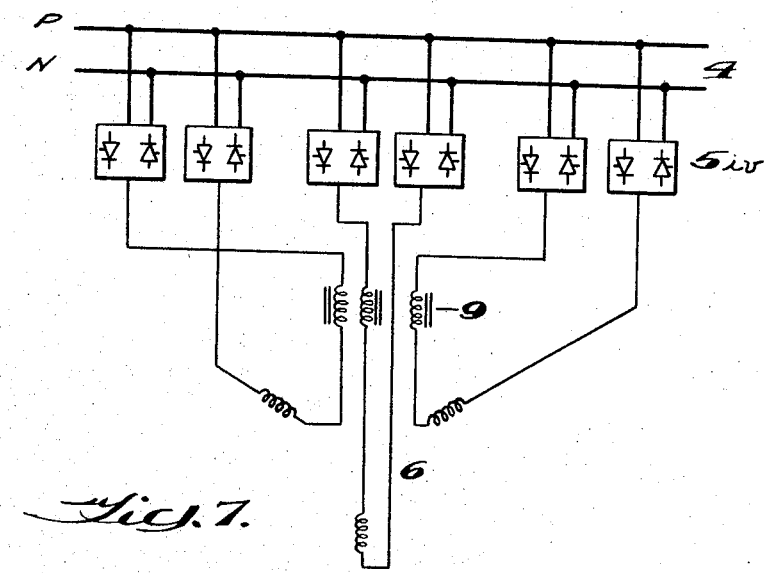
FIG. 6 illustrates still another embodiment wherein the currents of all phases of the polyphase alternating voltage which feed the motor are coupled with each other by induction over a common impedance coil.

Reduction in harmonic content of the alternating voltage supplied to motor 6 can also be effected by inductively coupling the currents of all phases with each other by means of a common impedance coil 9, in the manner shown in the embodiment according to FIG. 6. This has the result that the in-phase portions encounter a highly inductive impedance, while the fundamental wave, which is important here, meets with no impedance due to the face that the ampere turns cancel each other, as in any combination of three-phase current systems. The fundamental wave form can thus be formed properly as desired, while the in-phase harmonics encounter a high impedance and are thus reduced in the current. In the example shown in FIG. 6, the inverter groups 5iv of the individual phases are connected in series. The same arrangement is, however, also possible for a parallel connection of these inverter groups.

Figure 7:
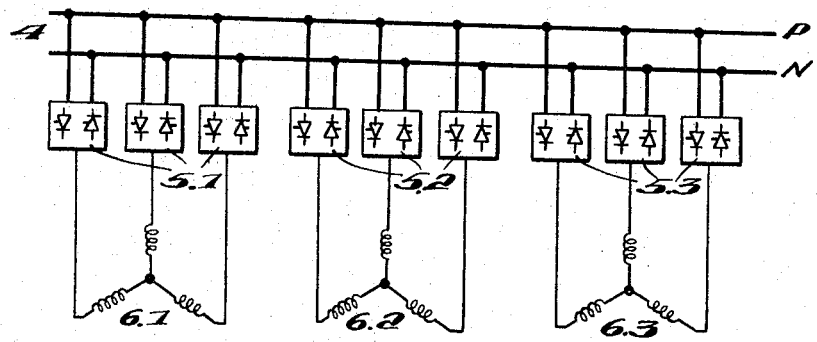
FIG. 7 illustrates an embodiment of the invention as applied to the supply of alternating current from the novel inverter circuit to a plurality of polyphase motors.

With the novel control arrangement according to the invention, it is also possible to reduce the harmonics by using several motors, as, for example, in locomotives. As shown in FIG. 7, each of the three motors 6.1, 6.2 and 6.3 is fed by one of the inverter groups 5.1, 5.2 and 5.3 respectively from the D.C. mains 4. The inverter valves of the same phase of different motors are controlled, however, by phase-shifted triangular voltages so that the harmonic in the current can be greatly reduced, if not in the individual motors, then at least in the D.C. mains which feed the motors.

Figure 8:
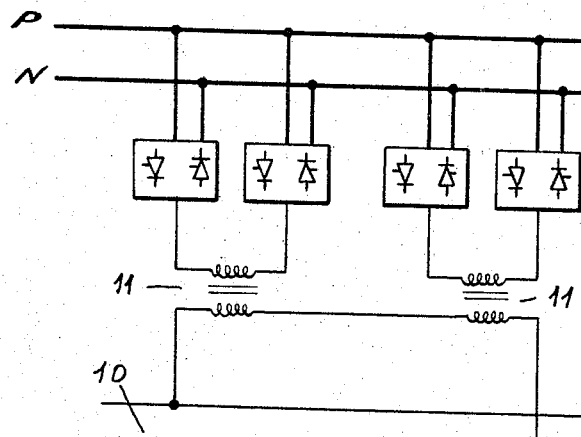
FIG. 8 illustrates another embodiment of the invention provided to establish a constant inverted, i.e. alternating, voltage from a D.C. mains and which utilizes four inverter groups per phase.

Another embodiment of the invention is represented in FIG. 8 which shows, in a similar manner, an inverter arrangement which produces a constant inverter voltage on bus bars 10 of desired frequency from a D.C. supply mains. Four inverter groups 5v are provided and these are fed from a D.C. mains 4. The outputs of the inverter groups are connected in pairs to transformers 11 and the secondaries of these transformers are connected in series and applied to the bus bars 10. This arrangement thus applies not only to the feeding of A.C. motors, though motors can naturally be connected to the bus bars 10, but it serves primarily to provide an A.C. supply source from a D.C. mains in the event the local supply system for alternating current power should fail. In order to make it as far as possible, free of harmonics, the control is effected in the indicated manner on the inverter groups 5v. Consequently, there are four inverter groups provided in this case which are connected in parallel on the D.C. side and which then ensure a certain freedom from harmonics. Naturally, it is also possible to provide additional filters in order to eliminate the last traces of harmonics. Such filters have not, however, been included in any of the illustrated embodiments. This latter arrangement of the inverter groups does not permit very low speeds of the motor since the transformers are then no longer effective at such low frequencies. But for this purpose, at least one group of inverters can be connected directly, without its own transformer, in series with secondary windings of the transformers for the other groups, not illustrated. At low motor speeds, only the groups connected without the transformers are then effective to supply alternating current power to the motor.

In conclusion, the object of the invention will thus have been seen to reduce, to a great extent, undesirable harmonics in the alternating current voltage waves supplied to the motor and also similar harmonics in the D.C. supply mains, thus increasing the efficiency and performance of motors which are supplied with power through operation of inverter circuits.

I claim:
1. In an inverter circuit for supplying a variable frequency polyphase alternating voltage output from a source of unidirectional voltage input, the combination comprising at least one pair of inverter groups connected between said input and each phase of said polyphase output, each said inverter group including a pair of grid-controlled valves, means producing a sinusoidal control voltage at a frequency corresponding to the desired frequency of said polyphase alternating voltage output, means producing first and second triangular control voltages having a frequency higher than the highest frequency desired for said polyphase alternating voltage output, said first and second triangular control voltages having the same frequency and amplitude but being displaced in phase by 180°, first and second mixer means for each triangular and sinusoidal control voltages, said first mixer means having as an input thereto said sinusoidal control voltage and said first triangular control voltage, and said second mixer means having as an input thereto said sinusoidal control voltage and said second triangular control voltage, said first mixer means including two outputs connected respectively to the control grids of the valves of one inverter group and said second mixer means including two outputs connected respectively to the control grids of the valves of the other inverter group, one output of each said mixer means carrying a voltage when the instantaneous value of the appertaining triangular voltage is higher than the instantaneous value of said sinusoidal voltage, and the other output of each said mixer means carrying a voltage when the instantaneous value of the appertaining triangular voltage is lower than the instantaneous value of said sinusoidal voltage.

2. An inverter circuit as defined in claim 1 wherein said pair of inverter groups correlated to each phase of said polyphase alternating voltage output are connected in parallel on their input side to said source of unidirectional voltage, and which further includes an impedance coil having the ends thereof connected respectively to the output sides of said pair of inverter groups and a tap intermediate said ends connected to the alternating voltage output.

3. An inverter circuit as defined in claim 1 wherein said pair of said inverter groups correlated to each phase of said polyphase alternating voltage output are connected in parallel on their input sides to said source of unidirectional voltage and which are connected in a series circuit on their output sides, each said series circuit including an impedance coil and said impedance coils being wound on a core common to all of said series circuits.

4. An inverter circuit as defined in claim 1 and which further includes impedance coils coupling inverter groups correlated to different phases of said polyphase alternating voltage output.

5. An inverter circuit as defined in claim 1 wherein there are at least two pairs of said inverter groups correlated to each phase of said polyphase alternating voltage output which are connected in parallel on their input sides to said source of unidirectional voltage, the outputs from each pair of inverter groups being connected in series with the primary of a transformer, and the secondaries of said transformers being connected in series to produce the alternating voltage output.

6. An inverter circuit as defined in claim 1 wherein said polyphase alternating voltage output is applied to a plurality of polyphase motors each fed by separate inverter groups and wherein the grid-controlled valves related to the same phase of different motors are controlled by phase-shifted triangular control voltages.

7. An inverter circuit as defined in claim 1 wherein two pairs of said inverter groups are correlated to each phase of said polyphase alternating voltage output which are connected in parallel on their input side to said source of unidirectional voltage, the 180° phase displaced triangular control voltages correlated to the mixers of one pair of inverter groups being displaced respectively by 90° with relation to the 180° phase displaced triangular control voltages correlated to the mixers of the other pair of inverter groups.

8. An inverter circuit as defined in claim 7 and which further includes an impedance coil for each pair of inverter groups, the ends of each said coil being connected respectively to the outputs of the inverter groups of each pair, a third impedance coil having the ends thereof connected respectively to mid taps on said first mentioned impedance coils, and a connection from a mid tap on said third impedance coil to the corresponding phase of said polyphase alternating voltage output.

References Cited

UNITED STATES PATENTS

| | | | |
|---|---|---|---|
| 3,089,992 | 5/1963 | Seney | 318—341 X |
| 3,165,686 | 1/1965 | MacDonald | 318—341 X |
| 3,241,023 | 3/1966 | Eby | 318—341 X |
| 3,241,024 | 3/1966 | Schade et al. | 318—341 X |
| 3,247,432 | 4/1966 | Robinson | 318—138 X |

OTHER REFERENCES

Selected Harmonic Reduction In Static D-C-A-C Inverters, Turnbill, Paper 63–1011, I.E.E.E., June 1963, 3 pp.

BENJAMIN DOBECK, *Primary Examiner.*

ORIS L. RADER, *Examiner.*

G. Z. RUBINSON, *Assistant Examiner.*